United States Patent [19]
Blount

[11] 4,336,340
[45] * Jun. 22, 1982

[54] PROCESS FOR THE PRODUCTION OF BROKEN-DOWN ORGANIC LIGNIN-CELLULOSE POLYMERS

[76] Inventor: David H. Blount, 5450 Lea St., San Diego, Calif. 92105

[*] Notice: The portion of the term of this patent subsequent to Oct. 7, 1997, has been disclaimed.

[21] Appl. No.: 207,391

[22] Filed: Nov. 17, 1980

Related U.S. Application Data

[63] Continuation-in-part of Ser. No. 134,975, Mar. 3, 1980, Pat. No. 4,283,311, which is a continuation-in-part of Ser. No. 13,139, Feb. 21, 1979, Pat. No. 4,226,982.

[51] Int. Cl.³ .......................... C08J 9/02; C08G 18/02
[52] U.S. Cl. ...................................... 521/84; 521/125; 521/130; 521/175; 524/871
[58] Field of Search ............ 536/101; 260/9, 17.4 CL, 260/17.4 UC; 521/84, 125, 130, 175

[56] References Cited

U.S. PATENT DOCUMENTS

| | | |
|---|---|---|
| 3,312,642 | 4/1967 | Schwenker et al. ........ 260/17.4 UC |
| 3,839,173 | 10/1974 | Blaszczak ............................... 260/9 |
| 4,032,483 | 6/1977 | Hartman ................................. 260/9 |
| 4,033,913 | 7/1977 | Sunden ........................ 260/17.4 CL |
| 4,100,328 | 7/1978 | Gallagher ............................... 260/9 |
| 4,153,768 | 5/1979 | Blount .................................. 521/130 |
| 4,170,697 | 10/1979 | Blount .................................. 521/130 |
| 4,220,757 | 9/1980 | Blount .................................... 536/84 |
| 4,226,982 | 10/1980 | Blount .................................. 536/101 |
| 4,283,311 | 8/1981 | Blount .................................... 260/9 |

OTHER PUBLICATIONS

Chemical Abstracts, Ninth Collective Index, vols. 76–85, 1972–1976, pp. 10313cs, 10314cs, 10317cs, 10318cs, 10320cs, 10321cs, 10322cs, 10323cs, 10324cs, 10327cs and 10385cs.
Chemical Abstracts, vol. 67, No. 16, Oct. 16, 1967, pp. 74617m and 74618n.

*Primary Examiner*—Ronald W. Griffin

[57] ABSTRACT

Small particles of cellulose-containing plants are mixed with an alkali metal hydroxide, then heated to 150° C. to 220° C. while agitating, thereby producing a broken-down lignin-cellulose polymer which is then reacted with a substituted organic compound to produce an organic broken-down lignin-cellulose polymer.

27 Claims, No Drawings

PROCESS FOR THE PRODUCTION OF BROKEN-DOWN ORGANIC LIGNIN-CELLULOSE POLYMERS

CROSS-REFERENCE TO RELATED APPLICATIONS

This application is a continuation-in-part of my copending U.S. patent application, Ser. No. 134,975, filed Mar. 3, 1980 now U.S. Pat. No. 4,283,311, issued Aug. 11, 1981, which is a continuation-in-part of my copending U.S. patent application, Ser. No. 013,139, filed Feb. 21, 1979, now U.S. Pat. No. 4,226,982.

BACKGROUND OF THE INVENTION

This invention relates to a process for the production of an organic broken-down lignin-cellulose polymer utilizing a water-soluble broken-down cellulose polymer and a substituted organic compound in an aqueous solution which are reacted to produce an organic broken-down lignin-cellulose polymer which may be in the form of a fine precipitated or as an aqueous dispersion.

The products produced by this invention have many commercial uses and may be utilized as molding powder, as coating agents for wood and metal, as films, as fillers, as impregnating agents, as adhesives, as binders, as caulking material, as fibers, as sheets, as casting materials, as putty material and may be further reacted with organic compounds to produce useful resinous products and foams.

An organic broken-down lignin-cellulose polymer is obtained by reacting the following components:

Component (a): Broken-down alkali metal lignin-cellulose polymer;
Component (b): An organic compound having a substituent which will split off during the reaction;
Component (c): Optionally, a solvent;
Component (d): Optionally, an emulsifying or dispersion agent.

Component (a)

Component (a), a broken-down alkali metal lignin-cellulose product, is produced by the processes outlined in my copending U.S. Patent Application, Ser. No. 013,139, filed Feb. 21, 1979, now U.S. Pat. No. 4,226,982, and is incorporated into this invention.

Water-soluble, broken-down, alkali metal lignin-cellulose polymers and carbohydrates are produced by mixing 3 parts by weight of a cellulose-containing plant or plant derivative and 2 to 5 parts by weight of an alkali metal hydroxide, then heating the mixture at 150° C. to 220° C. while agitating for 5 to 60 minutes.

Any suitable plant or the products of plants which contain cellulose may be used in this invention. The plant material is preferred to be in the form of small dry particles such as sawdust. Suitable plants include, but are not limited to, trees, bushes, agricultural plants, weeds, vines, straw, flowers, kelp, algae and mixtures thereof. Wood is the preferred plant. Commercial and agricultural waste products may be used, such as stalks, paper, cotton clothes, bagasses, etc. Wood fibers (wood pulp) with lignin removed may be used in this invention. Plants that have been partially decomposed, such as humus, peat, certain soft brown coal, manure containing cellulose, etc., may also be used in this invention.

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

The novel broken-down water-soluble alkali metal lignin-cellulose polymer produced by the process of this invention differs from the alkali cellulose polymers produced by the known processes. The broken-down alkali metal lignin-cellulose polymer is dark brown to black in color, has at least one —COH radical removed from each cellulose molecule, the usual lignin-cellulose bond is not broken in most of the cases and the cellulose molecules are broken down into smaller molecules of alkali metal broken-down lignin-cellulose which are water-soluble. When a cellulose polymer such as cotton or wood with the lignin removed is reacted with an alkali metal hydroxide by the process of this invention, a black water-soluble broken-down alkali metal cellulose polymer is produced; this polymer may be reacted with a mineral acid until the pH is about 6 and a black, foamed, broken-down cellulose resinous product and carbohydrates are produced. The foam is produced by the release of $CO_2$ which was removed from the cellulose polymer. When a mineral acid is added to an aqueous solution of the broken-down alkali metal lignin-cellulose polymer until the pH is about 6, a black resinous product floats to the top and is recovered and the carbohydrates are in the solution.

Compound (b)

Any suitable organic compound that will react with the broken-down alkali metal lignin-cellulose polymer may be used. An organic compound is preferred, having a substituent, which splits off during the reaction. These organic compounds which are the reactants used in the preparation of broken-down organic lignin-cellulose polymers have the graphical skeleton carbon structure of

where X represents the substituents which split off during the reaction. The R, R' and R" are selected from the following groups: hydrogen, saturated straight-chain carbon atoms, unsaturated carbon atoms, ether linkages, aromatic structures, another X and others, for it is to be understood that other structures may be employed. The X substituents can be halogen, acid sulfate, nitrate, acid phosphate, bicarbonate, sulfate formate, acetate, propionate, laurate, oleate, stearate, acid oxalate, acid malonate, acid tartrate, acid citrate, mixtures thereof and others.

Suitable substituted organic compounds include, but are not limited to, substituted alkyl compounds such as methyl halides such as methyl chloride, methyl bromide, methyl iodide, etc., methyl sulfate, methyl hydrogen sulfate, methyl hydrogen phosphate, methyl nitrate; ethyl halides such as ethyl chloride, ethyl bromide, ethyl iodide, etc., ethyl hydrogen sulfate, ethyl sulfate, ethyl hydrogen phosphate, ethyl nitrate, ethyl oxalate; propyl halides, propyl hydrogen sulfate, 1-nitropropane, 2-nitropropane, propyl hydrogen phosphate; butyl halides; butyl hydrogen sulfate, 2-nitro-1-butanol, butyl hydrogen phosphate, etc.; substituted unsaturated compounds such as vinyl chloride, vinyl bromide, vinyl acetate, vinylidine chloride; substituted carboxylic acids such as chloroacetic acid, dichloroacetic acid, sodium chloroacetate, bromoacetic acid, iodoacetic acid, α-chloropropionic acid, α-chlorobutyric acid, etc.; acid chlorides such as acetyl chloride, acetyl bromide, propionyl chloride, n-butyryl chloride, chloroacetic chloride, etc.; substituted allyl halides such as allyl halide, methyl allyl halide, etc.; carboxyl acid anhydrides such as acetic anhydride, propionic anhydride, n-butyric anhydride, isobutyric anhydride, etc.; organic esters such as ethyl acetate, methyl propionate, propyl formate, methyl formate, ethyl formate, methyl acetate, n-butyl acetate, ethyl chloroacetate, etc.; substituted hydroxyl compounds such as alkene halohydrins such as ethylene chlorohydrin, dthylene bromohydrin, glyceryl monochlorohydrin, etc.; substituted benzene compounds such as benzyl chloride, benzal chloride, nitrobenzene and p-chlorobenzoic acid.

Component (c)

Any suitable inorganic or organic solvent may be used in this invention. Suitable solvents include, but are not limited to, water, alcohols, such as methyl alcohol, ethyl alcohol, isopropyl alcohol, propyl alcohol, polyhydroxy organic compounds (polyols) such as ethylene glycol, propylene-1,2 and -1,3-glycol, butylene-1,4- and -2,3-glycol, hexane-1,6-diol, 2-methyl-propane-1,3-diol, glycerol, trimethylol propane, hexane-1,2,6-triol, butane-1,2,4-triol, trimethylol ethane, pentaerythritol, diethylene glycol, triethylene glycol, tetraethylene glycol, polyethylene glycol, dipropylene glycol, polypropylene glycol, dilintylene glycol, polybutylene glycols; polyesters, polyethers, sucrose polyethers and sucrose amine polyethers with at least 2, generally from 2 to 8, hydroxyl groups per molecule, and mixtures thereof.

Component (d)

Emulsifying or dispersing agents may be used in this invention, any salt-stable compound which is highly hydrophobous in nature and has a hydrophobic group as one component and a hydrophilic group as the other may be used. The emulsifying or dispersing agent which may be used for the formation of lattices of small-particle size are those compounds having such groups as $SO_3$, $SO_4$, $NH_2$, etc.; as the hydrophilic component and a higher molecular weight alkyl, aralkyl, aryl or alkyl group as the hydrophobic component. The more hydrophobic the entire compound becomes, the smaller the polymer particle size becomes in the latex.

Compounds which are most suitable as emulsifying or dispersing agents for latex formation are the lignin sulfonates such as calcium and sodium lignin sulfonates, alkyl benzene sulfonates having more than 20 carbon atoms in the alkyl group, aryl alkyl sulfonates, sorbitan monolaurates, especially those which are oil-soluble and slightly water-soluble, and others. The dominance of the hydrophobic group over the hydrophilic groups is one of the important factors in producing a latex of small-particle size. The molecular weight of the hydrophobic group alone is not the deciding factor, for aryl groups, for example, may be more hydrophobic than an alkyl group of like molecular weight. Aryl alkyl groups are more hydrophobic than alkyl aryl groups of the same molecular weight. Thus, by selection of emulsifying or dispersing agents, the particle size of the latex can be varied to suit any particular needs. Emulsifiers which can be used are sorbitan monolaurates, alkyl aryl sulfonates, alkyl aryl sulfates, aryl alkyl sulfonates, aryl alkyl sulfates, lignin sulfonates, methyl cellulose, sulfonated petroleum fractions, polymerized alkyl aryl sulfonates, polymerized aryl alkyl sulfonates, soybean lecithin, silicone surfactants and the like. The particle size can be controlled by selecting emulsifying or dispersing agents having different molecular-weight hydrophobic groups as well as different hydrophobic groups. The particle size will also vary with the concentration of the emulsifying or dispersing agents.

Epihalohydrin may be added with the substituted organic compound up to an amount by weight equal to the weight of the substituted organic compound and selected from the group consisting of epichlorohydrin, epibromohydrin, methyl epichlorohydrin, di-epi-iodohydrin, epifluorohydrin, epiiodohydrin and mixtures thereof. Epichlorohydrin is the preferred epihalohydrin.

Organic oxides may be used in this invention, such as ethylene oxide, propylene oxide, butylene oxide, styrene oxide, tetrahydrofuran and mixtures thereof up to an amount by weight equal to the weight of the substituted organic compound.

The primary object of this invention is to produce organic broken-down lignin-cellulose polymers. Another object is to produce organic broken-down lignin-cellulose polymer that may be used as molding powder, as coating agents for wood and metal, as films, as filters, as impregnating agents, as adhesives, etc. Another object is to produce organic broken-down lignin-cellulose polymers which will react with polyisocyanates to produce foam which may be utilized as thermal and sound insulation. Still another object is to produce aldehyde broken-down organic lignin-cellulose polymers.

DETAILED DESCRIPTION OF THE INVENTION

The preferred process to produce an organic broken-down lignin-cellulose polymer is to slowly add a substituted organic compound substituent, which will split off during the reaction, to a broken-down metal lignin-cellulose polymer in the amount wherein the mols of the substituted radicals are about equal to the mols of the alkali radicals in the mixture, while agitating for about 30 minutes at a temperature below the boiling temperature of the reactants; the reaction is complete in about 30 minutes to 8 hours, thereby producing an organic broken-down lignin-cellulose polymer. The salt produced may be removed by washing with water and then filtering or by using a solvent.

In an alternate method the broken-down alkali metal lignin-cellulose polymer is added to a solvent such as water, alcohols, polyhydroxy alcohols and mixtures thereof to produce a solution containing 10% to 70% broken-down alkali metal lignin-cellulose polymer, then a substituted organic compound having a substituent which will split off during the reaction, is slowly added to said solution while agitating at a temperature between ambient and just below the boiling temperature of the reactants and at a pressure up to 1500 psi for about 30 minutes; the reaction is complete in 30 minutes to 8 hours. When water is used as the solvent, an emulsifying or dispersing agent may be used in the amount of 1% to 5% in order to assist in mixing the broken-down alkali metal lignin-cellulose polymer and the substituted organic compound. The organic broken-down lignin-cellulose polymer may be recovered by filtration from an aqueous solution.

The chemical reaction of this invention may take place in any suitable physical condition. Ambient pressure is usually satisfactory, but in certain conditions, an elevated or below-ambient pressure may be useful. In cases when halogenated organic compounds are used, the reaction is speeded up by increased temperature (up to 200° C.) and pressure (up to 1500 psi). When organic hydrogen sulfate compounds are used, it may be necessary to decrease the temperature by cooling the reactants. Ambient temperature is usually satisfactory.

Any suitable aldehyde compound may be reacted with the broken-down alkali metal lignin-cellulose polymer with a substituted organic compound or be reacted at the same time that the substituted compound is reacting. Suitable aldehydes include, but are not limited to, formaldehyde, acetaldehyde, propionic aldehyde, furfural, crotonaldehyde, acrolein, butyl aldehyde, paraformaldehyde pentanals, hexanals, heptanals and mixtures thereof in the ratio of 1 to 5 parts by weight of the aldehyde to 2 parts by weight of the broken-down alkali metal lignin-cellulose polymer. The aldehyde is mixed with the water-soluble broken-down alkali metal lignin-cellulose polymer, then agitated at a temperature between ambient temperature and the boiling temperature of the aldehyde and at ambient pressure for 10 to 120 minutes, thereby producing an aldehyde alkali metal lignin-cellulose polymer. The aldehyde-alkali metal lignin-cellulose polymer is then mixed with a substituted organic compound having a substituent which will split off during the reaction, to said aldehyde-alkali metal lignin-cellulose polymer in the amount wherein the mols of the substituted radicals are about equal to the mols of the alkali radicals in the mixture, then heated to a temperature between ambient temperature and the boiling temperature of the reactants while agitating at an ambient pressure to 1500 psi for about 30 minutes; the reaction is complete in 30 minutes to 8 hours, thereby producing a broken-down organic lignin-cellulose polymer. The polymer usually gradually settles out and may be recovered by decantation or filtration.

The broken-down organic lignin-cellulose polymer utilizing an aldehyde may be ground into a molding powder, then molded into useful objects such as knobs, panels, art objects, handles, etc., by heat (180° C. to 220° C.) and by pressure. The broken-down organic lignin-cellulose polymer may be further reacted with polyisocyanates to produce useful solid objects or foams which may be used as thermal and sound insulation, for packaging, construction panels, etc. The organic broken-down lignin-cellulose polymer is also soluble in many of the common solvents and may be used as a protective coating for wood and metal and as an adhesive.

The broken-down organic lignin-cellulose polymers resinous products will react chemically with suitable polyisocyanates and/or polyisothiocyanates to produce resinous products and foams. All the broken-down organic lignin-cellulose polymers contain more than 2 hydroxyl and carboxyl groups per molecule.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

O=C=N—R—N=C=O wherein R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate, and
ethylene diisocyanate, Other polyisocyanates, polyisothiocyanates and their derivatives may be equally employed. Fatty diisocyanates are also suitable and have the general formula:

$$\begin{array}{c} NCO \\ | \\ (CH_2) \\ CH_3(CH_2)_x CH(CH_2)_y NCO \end{array}$$

where x+y totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenylpolymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or bioret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus, or aldehydes. Ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4') diisocyanate may be used in this invention. Suitable polyisocyanates which may be used according to the invention are described by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and, preferably, from about 1,000 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol, propylene-1,2- and -1,3-glycol; butylene-1,4- and -2,3-glycol; hexane-1,6-diol; octane-1,8-diol; neopentyl glycol; cyclohexanedimethanol-(1,4-bishydroxymethylcycohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as c-hydroxycaproic acid, may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane; aniline, ammonia, ethanolamine or ethylenediamine; sucrose polyethers such as those described, e.g., in German Auslegeschrifren Nos. 1,176,358 and 1,064,938, may also be used according to the invention. It is frequently preferred to use polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the cocomponent.

The polyacetals used may be, for example, the compounds which may be obtained from glycols, 4,4'-dihydroxydiphenylmethylmethane, hexanediol and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3 diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides includes, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.

5. Alkali metal metasilicate such as sodium metasilicate, potassium metasilicate and commercial dry granular sodium and potassium silicates. Heating is required to start the curing reaction.

6. Water containing 20% to 70% by weight of silica sol.

7. Activators (catalysts) which act as curing agents and are added to the polyurethane silicate prepolymer in the amount of 0.001% to 10% by weight. They may be added in water.

(a) Tertiary amines, e.g., triethylamine; tributylamine; N-methyl-morpholine; N,N,N',N'-tetramethylenediamine; 1,4-diazobicyclo-(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyldiethanolamine; N-ethyldiethanolamine; and their reactive products with alkylene oxides, e.g., propylene oxide and/or ethylene oxide and mixtures thereof.

(b) Organo-metallic compounds, preferably organotin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.

(c) Silaamines with carbon-silicon bonds are described, e.g., in British Pat. No. 1,090,589, may also be used as activators, e.g., 2,2,4-trimethyl-1,2-silamorpholine or 1,3-diethylaminoethyl-tetramethyldisiloxane.

(d) Other examples of catalysts which may be used according to the invention, and details of their action are described in Kunststoff-Handbuch, Volume VII, published by Vieweg and Hochtlen, Carl-Hanser-Verlag, Munich, 1966, on pages 96 and 102.

8. Water containing 1% to 10% by weight of bases which contain nitrogen such as tetraalkyl ammonium hydroxides.

9. Water containing 1% to 10% by weight of alkali metal hydroxides such as sodium hydroxide; alkali metal phenolates such as sodium phenolate or alkali metal alcoholates such as sodium methylate.

10. Water containing sodium polysulfide in the amount of 1% to 10% by weight.

11. Water containing 20% to 70% by weight of a water-binding agent, being capable of absorbing water to form a solid or a gel, such as hydraulic cement, synthetic anhydrite, gypsum or burnt lime.

12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. These additives are preferably used in quantities of 0% to 20%, but, preferably, 0.01% to 20%, by weight, based on the reaction mixture.

Negative catalyst, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethyl-phosphate or ammonium phosphate and polyphosphates, stabilizers against aging and weathering, pasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details aaout methods of using these additives and their action may be found in Kunststoff-Handbuch, Volume VI, published by Viewag and Hochtlen, Carl-Hanser-Verlag, Munich, 1966, on pages 103 to 113. The halogenated paraffins and inorganic salts of phosphoric acid are the preferred fire-retarding agents.

The preferred curing agent is an aqueous solution of silicates, sodium silicate and/or potassium silicate in water which is normally known as water glass. Aqueous solutions of silicates may be prepared in the form of 25% to 54% silicates. Silicon sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate, tris(2,3-dichloropropyl)-phosphate; polyoxypropylene-chloromethylphosphonate; cresyldiphenylphosphate; tricresylphosphate; tris-(beta-chloroethyl)-phosphate; tris-(2,3-dichloropropyl)-phosphate; triphenylphosphate; ammonium phosphate; perchlorinated diphenyl phosphate; perchlorinated terephenyl phosphate; hexabromocyclodecane; tribromophenol; dibromopropyldiene, hexabromobenzene; octabromodiphenylether; pentabromotoluol; polytribromostyrol, tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogenphosphate; ammonium chloride, phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane products.

The ratios of the essential reactants and optional reactants which lead to the polyurethane silicate resinous or foamed product of this invention may vary, broadly speaking, with ranges as follows:

(a) 1 to 95 parts by weight of an organic broken-down lignin-cellulose polymer;

(b) 50 parts by weight of polyisocyanate, polyisocyanate or isocyanate-terminated polyurethane prepolymer;

(c) up to 20% by weight of a foam stabilizer;

(d) up to 50% by weight of a chemically inert blowing agent, boiling within the range of from $-25°$ C. to $80°$ C.;

(e) up to 10% by weight of an activator;

(f) up to 200 parts by weight of a water-binding agent;

(g) 1 to 95 parts by weight of a polyol.

Percentages are based on the weight of the reactants, resinous product, polyol and polyisocyanate.

In the cases where the viscosity of the polyisocyanate is too high, it may be reduced by adding a low-viscosity isocyanate, or even by adding inert solvents such as acetone, diethyl ether of diethylene glycol, ether acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3–100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate) prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar of hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0 to 200% by weight, based on the weight of the reactants. When a water-binding agent is added and when the curing agent is an aqueous alkali metal silicate solution, a halogen- or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, published by Kirk-Othmer, pages 684 to 710, of the type of cement which may be used in the production of this invention and which are incorporated herein by reference.

Blowing agents may be used to improve or increase the foaming to produce cellular solid plastics such as acetone, ethyl acetate, methanol, ethanol, halogenated alkaned, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details of the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or be reacted with the polyisocyanate to produce a polyurethane prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high-dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reaction of the organic broken-down lignin cellulose polymer, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on Components a, b and c and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, aliminosilicates, cements, basalt wool or powder, glass fibers, carbon fibers, graphite, carbon black, Al-; Fe-, Cri- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components a, b and c in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluoroethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked up in a kneader.

In many cases, the polyurethane resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and be converted into fibers and foils. These fibers and foils may be used for producing synthetic incombustible paper or fleeces.

When the broken-down organic lignin-cellulose polymer and polyisocyanate are combined with expanded clay and an alkali metal silicate solution, a very good concrete is obtained which can, for example, be used as panels in the construction field. In this case, the foam material (expanded clay) plays the part of the binding material.

DESCRIPTION OF PREFERRED EMBODIMENTS

My invention will be illustrated in greater detail by the specific examples which follow, it being understood that these preferred embodiments are illustrative of, but not limited to, procedures which may be used in the production of broken-down organic lignin-cellulose polymers. Parts and percentages are by weight unless otherwise indicated.

EXAMPLE 1

About 2 parts by weight of fir sawdust and 1.5 parts by weight of sodium hydroxide flakes are mixed, then heated to 150° C. to 220° C. while agitating at ambient pressure for 5 to 60 minutes or until the mixture softens and expands into a brown, thick liquid which solidifies on cooling, thereby producing an organic broken-down sodium lignin-cellulose product.

Water is added to the broken-down sodium lignin-cellulose polymer to produce a 30% aqueous solution which is filtered to remove any unreacted cellulose, ethyl chloride gas is slowly added to the solution in an autoclave under 500 to 1500 psi in amount wherein the sodium atoms about equal the chloride atoms, while vigorously agitating the mixture for about 30 minutes at a temperature of 150° C. to 200° C. The reaction is complete in 30 minutes to 8 hours, thereby producing a light-brown broken-down ethyl lignin-cellulose polymer which settles out. The water, slat and unreacted components are removed by filtration.

EXAMPLE 2

About 2 parts by weight of small plant particles listed below and 2 parts by weight of sodium hydroxide are mixed, then heated to 150° C. to 220° C. while agitating at ambient pressure, with care being taken to avoid burning the mixture, for 5 to 60 minutes; the mixture begins to expand and a brown, thick liquid broken-down sodium cellulose polymer. The liquid solidifies on cooling and is ground into a powder. The powder is soluble in water, alcohols, polyhydric organic compounds and other solvents.

(a) oak sawdust
(b) fir sawdust
(c) ash sawdust
(d) seaweed
(e) cotton
(f) corn cobs
(g) cotton stalks
(h) bagasse
(i) paper
(j) oat straw Water is added to the broken-down sodium lignin-cellulose polymer produced from oak sawdust filtered to remove any unreacted sawdust, and a 70% aqueous solution of the broken-down sodium cellulose polymer is produced; then propyl chloride is slowly added to the solution in an autoclave in an amount wherein the chloride atoms are about equal to the sodium atoms, while vigorously agitating the mixture at a pressure of 500 to 1500 psi and temperature of 150° C. to 200° for about 30 minutes. The reaction is complete in 30 minutes to 8 hours, thereby producing a light-brown propyl lignin-cellulose polymer which precipitates out. The water, salt and unreacted components are removed by filtration and may be further treated to recover the carbohydrates.

EXAMPLE 3

Methyl chloride is slowly added to an aqueous solution containing 60% broken-down sodium cellulose as produced in Example 2c and 2% sodium lignin sulfonate in an autoclave at 1000 to 1500 psi while agitating and keeping the temperature between 150° C. to 200° C. for 30 minutes. The reaction is complete in 30 minutes to 8 hours, thereby producing a methyl lignin-cellulose polymer. The methyl chloride is added in an amount wherein the chloride atoms are about equal to the sodium atoms.

EXAMPLE 4

The broken-down alkali lignin-cellulose polymer produced in Example 2f is mixed with ethyl acetate in an about equal amount while agitating for about 30 minutes, thereby producing a broken-down organic lignin-cellulose polymer. The polymer is recovered by filtration.

EXAMPLE 5

Propane-1-dihydrogen phosphate is slowly added to a broken-down alkali metal cellulose polymer as produced in Example 2h in an amount wherein the phosphate radicals are about equivalent to the sodium radicals while agitating at a temperature just below the boiling temperature of the reactants for 30 minutes. The reaction is complete in 30 minutes to 8 hours, thereby producing a propyl lignin-cellulose polymer.

EXAMPLE 6

About 3 parts by weight of a broken-down alkali metal lignin-cellulose, as produced in Example 2f are ground into a fine powder, then bis-monochloroacetic acid, in the amount wherein the chlorine atoms are about equal to the sodium atoms in the mixture, is slowly added while agitating at a temperature just below the boiling temperature of monochloroacetic acid for about 30 minutes. The reaction is complete in 30 minutes to 8 hours, thereby producing a carboxymethyl lignin-cellulose polymer.

EXAMPLE 7

An amount of nitrobenzene, wherein the nitro and alkali metal radicals are about equal is slowly added to the broken-down alkali metal cellulose produced in 2b while agitating at a temperature just below the boiling temperature of paranitrobenzene for about 30 minutes. The reaction is complete in 30 minutes to 8 hours, thereby producing a benzyl lignin-cellulose polymer.

EXAMPLE 8

About 10 parts by weight of broken-down alkali metal lignin-cellulose as produced in Example 2j are dissolved in ethanol, then butane-1-hydrogen sulfate is slowly added, in an amount wherein the hydrogen sulfate radicals are about equal to the sodium radicals, while agitating for about 30 minutes. The reaction is complete in 30 minutes to 8 hours, thereby producing a brown organic lignin-cellulose polymer.

Other substituted organic compounds may be used in place of butane-1-hydrogen sulfate such as para chlorobenzene; 2-nitrotoluene; 1-chloro-2-propanol; methyl sulfate; 1,1-bromopropane; ethyl sulfate; 1-bromo-2-butene; ethylene chlorohydrin; ethyl hydrogen sulfate; dichloroacetic acid; p-chlorobenzyl and mixtures thereof.

EXAMPLE 9

About 10 parts by weight of the broken-down sodium lignin-cellulose polymer as produced in 2b and 10 parts by weight of polyethylene glycol (mol. wt. 380 to 420) are mixed and heated until the polymer goes into solution; then ethyl chloride is slowly added in an autoclave at 1000 to 1500 psi in an amount wherein the chlorine atoms about equal the sodium atoms while agitating at a temperature between 150° C. to 200° C. for about 30 minutes, thereby producing an ethyl lignin-cellulose polymer.

About 10 parts by weight of TDI and 0.05 part by weight of triethylenediamine are added to the ethyl lignin-cellulose polymer in the polyethylene glycol and thoroughly mixed at ambient temperature. The mixture begins to expand in a few seconds and expands 8 to 12 times its original volume to produce a rigid polyurethane foam which is light brown in color, touch and somewhat flexible.

Other polyols and polyisocyanate may be used in this example in place of polyethylene glycol and TDI. The polyurethane foam may be produced in large slabs, then cut into sheets of the desired thickness and use as sound and thermal insulation in homes, buildings, aircraft and automobiles.

EXAMPLE 10

Ethyl acetate is slowly added in an amount when in 1 mol of the ethyl acetate is added per 1 mol of the sodium hydroxide present in the broken-down sodium lignin-cellulose polymer produced in 2b while agitating at a temperature just below the boiling point of the ethyl acetate for about 30 minutes, thereby producing brown granules of a broken-down organic lignin-cellulose polymer.

The polymer is then washed with water filtered to remove the salt, then dried. The dried polymer is then heated to 160° C. to 200° C., then forced into a mold under pressure to produce a useful object such as knobs, handles, art objects, etc., which are brown in color and are rigid and tough.

EXAMPLE 11

About 10 parts of the broken-down organic lignin-cellulose polymer as produced in Example 10 is mixed with 10 parts by weight of polyethylene glycol (mol. wt. 380 to 420) and the polymer goes into solution, then 15 parts by weight of TDI are added and thoroughly mixed. About 0.3 part by weight of TDI are added and thoroughly mixed. About 0.3 part by weight of triethylenediamine is added and thoroughly mixed. The mixture begins to expand in a few seconds. The mixture expands 8 to 12 times its original volume, thereby producing a rigid, cream-colored polyurethane foam.

EXAMPLE 12

About 10 parts by weight of broken-down alkali metal lignin-cellulose polymer as produced in Example 1 and 5 parts by weight of an aqueous solution containing 37% by weight of formaldehyde are mixed, then heated to below the boiling point of the reactants while agitating for 10 to 120 minutes, thereby producing an aldehyde-broken-down alkali metal lignin-cellulose polymer; then propane-1-hydrogen sulfate is added to the aqueous solution of aldehyde-broken-down alkali metal lignin-cellulose polymer, in an amount wherein the hydrogen sulfate radicals are about equal to the alkali metal radicals, while agitating at ambient temperature and pressure for about 30 minutes. The reaction is complete in 30 minutes to 8 hours, thereby producing an aldehyde broken-down lignin-cellulose propionate polymer.

Other aldehydes may be used in place of formaldehyde such as acetaldehyde, propionic aldehyde, furfural, crotonaldehyde, acrolein, benzaldehyde, butyl aldehyde, pentanals, hexanals, heptanals, octanals and mixtures thereof.

Other substituted organic compound listed in the specification may be used in place of propane hydrogen sulfate.

EXAMPLE 13

The dried powdered broken-down organic lignin-cellulose polymer as produced in Example 10 is mixed with about equal parts by weight of "MDI" and 10% by weight of trimethylamine, based on the organic lignin-cellulose polymer. The mixture expands in a few seconds to produce a rigid polyurethane foam.

EXAMPLE 14

About 2 parts by weight of the broken-down lignin-cellulose propionate polymer as produced in Example 11 and 2 parts by weight of isocyanate-terminated polyurethane prepolymer listed below and 0.2 parts by weight of water containing 10% by weight of triethyleneamine and 30% by weight of sodium silicate are mixed and in a few minutes, a solid polyurethane resinous product is produced. This resinous product may be used as a cavity filler.

| Example | Isocyanate-terminated Polyurethane Prepolymer |
|---|---|
| a | Polyphenyl-polymethane-isocyanate with polyethylene oxide monohydric alcohol (mol. wt. 1100), initiated on trimethylol propane to produce a prepolymer with an NCO content of about 18%. |
| b | TDI with polyethylene (mol. wt. 1000) to produce a prepolymer with an NCO content of about 24%. |
| c | Residue of tolylene diisocyanate distillation with about 20% by weight of NCO with polyethylene glycol (mol. wt. 1500) to produce a prepolymer with an NCO content of about 10%. |
| d | Tolylene diisocyanate with castor oil to produce a prepolymer with an NCO content of about 15%. |
| e | Tolylene diisocyanate with a liquid hydroxyl-terminated polybutadiene (mol. wt. 500) to produce a prepolymer with an NCO content of about 7%. |
| f | Toluene diisocyanate with a hydroxyl-group-containing polysulfide polymer to produce a prepolymer an NCO content of about 12%. |
| g | Methylene bis-phenyl diisocyanate with a liquid polyepichlorohydrin to produce a prepolymer of about 16%. |
| h | Tolylene diisocyanate with a polyester (4 mols of glycerol, 2.5 mols of adipic acid and 0.5 mol of phthalic anhydride) to produce a prepolymer with an NCO content of about 20%. |

EXAMPLE 15

About 10 parts by weight of the aldehyde broken-down lignin-cellulose propionate polymer as produced in Example 12, 10 parts by weight of a sucrose amine polymer (POLY G 71-356 as produced by Olin Chemical), 15 parts by weight of MDI and 10 parts by weight of sodium metal silicate pentahydrate are mixed at 30° C. to 40° C. The mixture begins to expand in 15 to 45 seconds and expands 8 to 12 times its original volume to produce a rigid tough polyurethane silicate foam. The foam is flame-resistant and may be used in construction of doors, panels and be used as thermal and sound insulation. It may be cut into the desired width and thickness. Other alkali metal silicates may be used in place of sodium silicate.

EXAMPLE 16

About 10 parts by weight of the dried broken-down ethyl lignin-cellulose polymer as produced in Example 1, 10 parts by weight of polypropylene glycol (mol. wt. 1200) 0.5 part by weight of "DABCO R-8020", produced by Air Products (triethylenediamine and triethanolamine), 15 parts by weight of "PAPA 27" produced by Upjohn (MDI), 30 parts by weight of Portland Cement and 30 parts by weight of plaster's sand are mixed thoroughly. The mixture is then poured into 4"×6"×16" concrete block molds in the amount of ½" to ¾" in depth. In a few seconds to 1 minute, the mixture begins to expand and fills the molds. The mixture hardens within 5 minutes and is taken from the mold and placed in water for about 2 minutes. The excess cement is cured with the water, thereby producing polyurethane silicate concrete blocks. These blocks may be used for building walls which have excellent

EXAMPLE 17

About 10 parts by weight of moist, broken-down alkali metal lignin-cellulose polymer as produced in Example 2b and 6 parts by weight of sodium chloroacetate are thoroughly mixed at ambient temperature and pressure, then agitated for 30 minutes to 8 hours, thereby producing a sodium carboxymethyl lignin-cellulose polymer.

The sodium carboxymethyl lignin-cellulose polymer is then treated with a weak acid solution such as sodium bicarbonate or an acid-type cation exchange resin until neutralized, thereby producing a carboxymethyl lignin-cellulose polymer.

EXAMPLE 18

Fine granular broken-down alkali metal lignin-cellulose polymer as produced in Example 2b and chloroacetic acid in an amount wherein the alkali metal radicals are about equal to the chlorine atoms are mixed and agitated for about 30 minutes to 8 hours, thereby producing carboxymethyl cellulose polymer.

EXAMPLE 19

About 100 parts by weight of broken-down alkali metal lignin-cellulose polymer as produced in Example 2b in ethyl alcohol is added to a reactor (autoclave) and ethyl chloride gas is slowly added under pressure while agitating. The temperature is slowly raised to 180° C. to 200° C. under a pressure of 1000 to 1500 psi until no further consumption of ethyl chloride occurs. The ethyl lignin-cellulose polymer is separated from the salt by using a solvent such as acetone to extract the polymer. The polymer is then recovered by evaporating the solvent or precipitating it from the acetone.

EXAMPLE 20

About 100 parts by weight of moist broken-down alkali metal lignin-cellulose polymer as produced in Example 2b and 10 parts by weight of propylene oxide are added to an autoclave, then ethyl chloride gas is slowly added to the autoclave in an amount wherein the alkali metal radicals are about equal to the chlorine atoms. The temperature is raised to 175° C. to 200° C. while agitating at a pressure of 500 to 1500 psi for 30 minutes to 8 hours, thereby producing a hydropropyl ethyl lignin-cellulose polymer. The salt is then removed by washing the polymer.

Other organic oxides may be used in place of propylene oxide, such as ethylene oxide, styrene oxide, butylene oxide, tetrahydrofuran and mixtures thereof.

EXAMPLE 21

About 100 parts by weight of moist broken-down alkali metal lignin-cellulose polymer as produced in Example 2c and 10 parts by weight or propylene oxide are added to an autoclave, then methyl chloride gas is added in an amount wherein the alkali metal radicals are about equal to the chlorine atoms while agitating, then the temperature is raised to 150° C. to 200° C. at a pressure of 500 to 1500 psi for 30 minutes to 8 hours, thereby producing an hydropropyl methyl lignin-cellulose polymer.

EXAMPLE 22

About 100 parts by weight of moist broken-down alkali metal lignin-cellulose polymer as produced in 2f are added to an autoclave, then methyl sulfate is added in an amount wherein the alkali metal radicals are about one-half as many as the sulfate radicals, while agitating at a temperature of 150° C. to 200° C. and up to 1500 psi for 30 minutes to 8 hours, thereby producing a methyl lignin-cellulose polymer and salt.

EXAMPLE 23

About 100 parts by weight of the broken-down alkali metal cellulose polymer as produced in Example 2e and an equal amount of chloroacetic acid and ethylene chlorohydrin, in an amount wherein the alkali metal radicals about equal the chlorine atoms, are mixed at ambient temperature and pressure and are agitated for 30 minutes to 8 hours, thereby producing a hydroxyl ethyl carboxymethyl cellulose polymer and salt.

EXAMPLE 24

About 100 parts by weight of the moist broken-down alkali metal lignin-cellulose polymer and about equal parts by weight of chloroacetic acid and epichlorohydrin, in an amount wherein the alkali metal radicals are about equal to the chlorine atoms, are mixed, then agitated for 30 minutes to 8 hours at a temperature between ambient and the boiling temperature of the reactants, thereby producing a carboxymethyl lignin-cellulose propyl epoxy resin.

EXAMPLE 25

About 100 parts by weight of moist broken-down alkali metal lignin-cellulose polymer as produced in Example 2b and trichlorobutylene oxide, in an amount wherein about one-third as many alkali metal radicals as chlorine atoms are present, are mixed, then agitated at a temperature below the boiling temperature of the reactants for 30 minutes to 8 hours, thereby producing a lignin-cellulose chlorobutylene oxide resin and salt. The salt is removed by washing with water. Carbohydrates are also present in the washings.

EXAMPLE 26

About 100 parts by weight of moist broken-down alkali metal lignin-cellulose polymer as produced in Example 2b and 50 parts by weight of acrylonitrile are mixed, then agitated at a temperature up to the boiling temperature of acrylonitrile and at ambient pressure for 30 minutes to 8 hours, thereby producing a cyanoethylated lignin-cellulose polymer and salt. The salt is removed by washing.

EXAMPLE 27

About 100 parts by weight of moist broken-down alkali metal lignin-cellulose polymer as produced in Example 2b and about equal parts by weight of benzyl chloride and vinylidene chloride, in an amount wherein the alkali metal radicals and chlorine atoms are about equal, are mixed in an autoclave, then agitated at a temperature just below the boiling point of the reactants for 30 minutes to 8 hours, thereby producing an ethylene benzyl lignin-cellulose polymer.

EXAMPLE 28

About 100 parts by weight of broken-down alkali metal lignin-cellulose polymer as produced in Example 2b and vinyl acetate, in an amount wherein the alkali metal radicals are about equal to the acetate radicals, are mixed, then agitated for 30 minutes to 8 hours, thereby producing an organic lignin-cellulose polymer.

EXAMPLE 29

About 100 parts by weight of broken-down alkali metal lignin-cellulose polymer as produced in Example 2b and acetic anhydride, in an amount wherein the mols of alkali metal radical are about equal to the mols of acetic anhydride, are mixed, then agitated at a temperature up to the boiling point of the reactants, thereby producing a lignin-cellulose acetate polymer and sodium acetate. The salt is removed by washing or by using a solvent.

EXAMPLE 30

About 100 parts by weight of broken-down alkali metal lignin-cellulose polymer produced in Example 2b and about equal parts by weight of acetic anhydride, propylene oxide and ethyl hydrogen sulfate, in an amount wherein the alkali metal radicals and the hydrogen sulfate radicals are about equal, are mixed, then agitated at a temperature up to the boiling temperature of the reactants for 30 minutes to 8 hours, thereby producing a hydroxypropyl ethyl lignin-cellulose acetate polymer and salt.

EXAMPLE 31

About 100 parts by weight of broken-down alkali metal lignin-cellulose polymer as produced in Example 2b and chloroacetic anhydride, in an amount wherein the alkali metal radical and chlorine atoms are about equal, are mixed, then agitated at a temperature up to the boiling temperature of the reactants and at ambient pressure for 30 minutes to 8 hours, thereby producing a carboxymethyl lignin-cellulose acetate polymer and salt.

EXAMPLE 32

About equal parts by weight of an organic lignin-cellulose polymer as produced in the listed examples, polyethylene glycol (mol. wt. 600), containing 2% by weight of triethylenediamine, 10% by weight of trichlorotrifluoroethane and 2% sodium doctyl sulfosuccinate, and MDI (PAPI 27 produced by Upjohn) are mixed thoroughly. The mixture begins to expand in 15 to 45 seconds, producing a rigid polyurethane foam.

| Example | Organic Lignin-Cellulose Polymer | Produced in Example |
|---|---|---|
| a | Ethyl lignin-cellulose polymer. | 1 |
| b | Propyl lignin-cellulose polymer. | 2 |
| c | Methyl cellulose polymer. | 3 |
| d | Ethyl lignin-cellulose polymer. | 4 |
| e | Propyl lignin-cellulose polymer. | 5 |
| f | Carboxymethyl lignin-cellulose polymer. | 6 |
| g | Benzyl lignin-cellulose polymer. | 7 |
| h | Butyl lignin-cellulose polymer. | 8 |
| i | Ethyl lignin-cellulose polymer. | 10 |
| j | Formaldehyde propyl lignin-cellulose polymer. | 12 |
| k | Carboxymethyl lignin-cellulose polymer. | 17 |
| l | Hydropropyl ethyl lignin-cellulose polymer. | 20 |
| m | Hydropropyl methyl lignin-cellulose polymer. | 21 |

| Example | Organic Lignin-Cellulose Polymer | Produced in Example |
|---|---|---|
| n | Hydroxy ethyl carboxymethyl cellulose polymer. | 23 |
| o | Carboxymethyl lignin-cellulose propyl epoxy resin. | 24 |
| p | Lignin-cellulose chlorobutylene epoxy resin. | 25 |
| q | Ethylene lignin-cellulose polymer. | 28 |
| r | Lignin-cellulose acetate polymer. | 29 |
| s | Hydroxypropyl ethyl lignin-cellulose acetate polymer. | 30 |
| t | Carboxymethyl lignin-cellulose acetate polymer. | 31 |

EXAMPLE 33

About 100 parts by weight of broken-down alkali lignin-cellulose as produced in Example 2b, 100 parts by weight of a 37% aqueous solution of formaldehyde and ethylene hydrohydrin, in an amount wherein the alkali metal radicals are about equal to the chlorine atoms, are mixed, then agitated at a temperature up to the boiling point of the reactants for 30 minutes to 8 hours, thereby producing a formaldehyde hydroxyethylene lignin-cellulose resin and salt.

EXAMPLE 34

About 100 parts by weight of broken-down lignin-cellulose polymer as produced in Example 2b, 25 parts by weight of crotonaldehyde and allyl halide, in an amount wherein the chlorine atoms are about equal to the alkali metal radicals, are mixed at ambient temperature and pressure, then agitated at a temperature below the boiling temperature of allyl chloride for 30 minutes to 8 hours, thereby producing an aldehyde allyl lignin-cellulose polymer and salt.

EXAMPLE 35

About 100 parts by weight of broken-down lignin-cellulose polymer as produced in Example 2b, about equal parts by weight of acetic anhydride and ethylene chlorohydrin in an amount wherein the alkali metal radicals are about equal to the chlorene atoms and acetate radicals, plus 20 parts by weight of propylene oxide are mixed at ambient temperature and pressure, then agitated for 30 minutes to 8 hours, thereby producing an organic lignin-cellulose polymer.

About 30 parts by weight of the organic lignin-cellulose polymer, 10 parts by weight of polyethylene glycol (380 mol. wt.) containing 1% by weight of triethylenediamine, parts by weight of MDI ("PAPI" produced by Upjohn) and 6 parts by weight of trichlorotrifluoroethane are mixed. In 15 to 45 seconds, the mixture begins to expand and produces a rigid polyurethane foam which weighs about 3 lbs. per cubic foot and is tan in color. The foam may be used for insulation, sound proofing, door cores, construction panels, art objects, etc.

Although specific materials and conditions were set forth in the above examples, these were merely illustrative of preferred embodiments of my invention. Various other compositions, such as the typical materials listed above, may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended Claims.

I claim:

1. The process for the production of broken-down organic lignin-cellulose polymer by mixing and reacting the following components:

Component (a): Broken-down alkali metal lignin-cellulose polymer produced by mixing 2 to 5 parts by weight of an alkali metal hydroxide, selected from the group consisting of sodium hydroxide, potassium hydroxide and mixtures thereof with 3 parts by weight of a cellulose-containing plant particle, then heating the mixture at from 150° C. to 220° C. while agitating for 5 to 60 minutes;

Component (b): A mono-substituted organic compound having a substituent which will split off during the reaction to said broken-down alkali metal lignin-cellulose polymer in the amount wherein the mols of the substituted radicals are about equal to the mols of the alkali radicals in the mixture.

2. The process of claim 1 wherein the substituted organic compound contains one substituent, selected from the group consisting of acid sulfate, nitrate, sulfate, acid phosphate, bicarbonate, formate, acetate, propionate, laurate, oleate, stearate, oxalate, acid malonate, acid tartrate, acid citrate, halogens, and mixtures thereof.

3. The process of claim 1 wherein an emulsifying or dispersing agent selected from the group consisting of lignin sulfonates, alkyl aryl sulfonates, aryl alkyl sulfonates, sorbitan monolaurates, alkyl aryl sulfates, methyl cellulose, sulfonated petroleum fractions, polymerized alkyl aryl sulfonates, polymerized aryl alkyl sulfonates, soybean lecithin, silicone surfactants and mixtures thereof in an aqueous solution is added to the unreacted mixture.

4. The process of claim 1 wherein lignin sulfonate in an aqueous solution is added to the unreacted mixture as an emulsifying or dispersing agent.

5. The process of claim 1 wherein the substituted organic compound is an alkyl halide.

6. The product produced by the process of claim 1.

7. The process of claim 1 wherein the broken-down alkali metal lignin-cellulose polymer is first added to a solvent selected from the group consisting of water, methanol, ethanol, isopropyl alcohol, ethylene glycol, propylene, glycol, glycerol, furfuryl alcohol, polyester polymer with 2 or more hydroxyl groups, sucrose amine polymer with 2 or more hydroxyl groups, polyether polymers with 2 or more hydroxyl groups and mixtures thereof.

8. The process of claim 1 wherein the broken-down alkali metal lignin-cellulose polymer is first reacted with an aldehyde selected from the group consisting of formaldehyde, acetaldehyde, propionic aldehyde, furfural, crotonaldehyde, acrolein, butyl aldehyde, paraformaldehyde, pentanals, hexanals, heptanals and mixtures thereof in in the ratio of 1 to 5 parts by weight of the aldehyde to 2 parts by weight of the broken-down alkali metal lignin-cellulose polymer.

9. The product produced by the process of claim 9.

10. The process of claim 1 wherein an additional step is taken wherein 1 to 95 parts by weight of the broken-down organic lignin-cellulose polymer and 50 parts by weight of a polyisocyanate or a polyisothiocyanate are mixed and reacted to produce a polyurethane product.

11. The process of claim 10 wherein the polyisocyanate is selected from the group consisting of aliphatic, cycloaliphatic, araliphatic, aromatic and hetrocyclic polyisocyanates and mixtures thereof.

12. The process of claim 10 wherein the polyisocyanate is a phosgenation product of aniline-formaldehyde condensation.

13. The process of claim 10 wherein the polyisocyanate is accompanied by foaming.

14. The product produced by the process of claim 10.

15. The process of claim 1 wherein an additional step is taken wherein 1 to 95 parts by weight of the broken-down organic lignin-cellulose polymer, 1 to 95 parts by weight of a polyol, 50 parts by weight of an organic polyisocyanate, up to 20% by weight of a foam stabilizer, up to 50% by weight of a chemically-inert blowing agent, boiling within the range of from −25° C. to 80° C., up to 10% by weight of an activator, up to 50% by weight of a curing agent, and up to 200 parts by weight of a water-binding agent, percentages based on the weight of the reactants, are mixed and allowed to react, thereby producing a polyurethane foam.

16. The process of claim 15 wherein the organic polyisocyanate is selected from the group consisting of tolylene diisocyanate, phosgenation product of aniline-formaldehyde condensation and mixtures thereof.

17. The process of claim 15 wherein the polyol is selected from the group consisting of polyether glycols, polyhydric alcohols, castor oil, and polyesters, polyamides, polyacetals and polycarbonates which contain 2 or more hydroxyl groups per molecule and mixtures thereof.

18. The product produced by the process of claim 15.

19. The process of claim 15 wherein the water-binding agent is selected from the group consisting of hydraulic cement, synthetic anhydride, gypsum and burnt lime.

20. The process of claim 1 wherein an additional step is taken wherein 1 to 95 parts by weight of the broken-down organic lignin-cellulose polymer, up to 20% by weight of a foam stabilizer, up to 20% by weight of a curing agent, up to 50% by weight of a chemically-inert blowing agent, boiling within the range of from −25° C. to 80° C., up to 10% by weight of an activator, percentage based on the weight of the reactants, and 50 parts by weight of an isocyanate-terminated polyurethane prepolymer are mixed and allowed to react, thereby producing a polyurethane resinous product.

21. The process of claim 20 wherein the isocyanate-terminated polyurethane prepolymer is selected from the group consisting of an isocyanate-terminated polyester, isocyanate-terminated polyether, isocyanate-terminated polybutadiene, isocyanate-terminated polysulfide and mixtures thereof.

22. The process of claim 20 wherein the process is accompanied by foaming.

23. The product produced by the process of claim 20.

24. The process of claim 1 wherein an additional step is taken wherein an organic epoxide compound is added with the broken-down alkali metal lignin-cellulose polymer and/or substituted organic compound in an amount up to the amount by weight of the substituted organic compound, and selected from the group consisting of ethylene oxide, propylene oxide, styrene oxide, butylene oxide, tetrahydrofuran, and mixtures thereof.

25. The product produced by the process of claim 24.

26. The process of claim 1 wherein an additional step is taken wherein an epihalohydrin, selected from the group consisting of epichlorohydrin, epibromohydrin, methyl epichlorohydrin and mixtures thereof, is added with the substituted organic compound in an amount up to the amount by weight of the substituted organic compound.

27. The product produced by the process of claim 26.

* * * * *